US006395082B2

(12) United States Patent
Shimbori

(10) Patent No.: US 6,395,082 B2
(45) Date of Patent: May 28, 2002

(54) COATING MATERIAL FOR INNER SURFACE OF CATHODE-RAY TUBE

(75) Inventor: Hiroshi Shimbori, Chiba (JP)

(73) Assignee: Hitachi Powdered Metals Co., Ltd., Chiba (JP)

( * ) Notice: Subject to any disclaimer, the term of this patent is extended or adjusted under 35 U.S.C. 154(b) by 0 days.

(21) Appl. No.: 09/842,250

(22) Filed: Apr. 26, 2001

(30) Foreign Application Priority Data

May 17, 2000 (JP) ....................................... 2000-145628

(51) Int. Cl.[7] ................................................ C04B 14/04

(52) U.S. Cl. ........................ 106/626; 252/502; 252/504; 252/506; 252/507

(58) Field of Search ................................. 106/600, 626; 252/502, 506, 507, 504

(56) References Cited

U.S. PATENT DOCUMENTS 3,791,546 A * 2/1974 Maby et al.
4,041,347 A 8/1977 Deal et al.
4,760,310 A 7/1988 Deyama et al.
5,575,953 A 11/1996 Tachizono et al.
5,667,729 A * 9/1997 Shimbori .................... 252/508
5,686,781 A * 11/1997 Kim ........................... 313/112

FOREIGN PATENT DOCUMENTS

CN 1138075 * 12/1996
JP A57136747 8/1982

OTHER PUBLICATIONS

Hashiba et al., J. Vac. Soc. Jpn., vol. 42, No. 12, pp. 1100–1105 (1999).

* cited by examiner

*Primary Examiner*—Paul Marcantoni
(74) *Attorney, Agent, or Firm*—Birch, Stewart, Kolasch & Birch, LLP

(57) ABSTRACT

In a coating material for the inner surface of a cathode-ray tube comprising an aqueous dispersion medium containing silicates of lithium and potassium and a dispersing agent, and a graphite particles and, if necessary, particles of the other specific metal compounds suspended therein, the invention is characterized in that the molar ratio of potassium to lithium is in the range of 1 to 9, and the molar ratio of silicon dioxide to the total quantity of oxides of lithium and potassium is in the range of 2.5 to 3.5, and the obtained coating material is most suitable for suppressing the quantities of gases released from the inner coating, for making good use of gas-adsorbing ability of graphite, and for increasing the degree of vacuum in the cathode-ray tube.

5 Claims, 1 Drawing Sheet

COATING MATERIAL FOR INNER SURFACE OF CATHODE-RAY TUBE

BACKGROUND OF THE INVENTION

1. Field of the Invention

The present invention relates to a coating material for the inner surface of a cathode-ray tube. More particularly, the invention relates to a coating material used for forming an electroconductive coating, which scarcely releases gases during an exhausting-baking step and has a good gas-adsorbing property.

2. Description of Prior Art

Cathode-ray tubes are generally manufactured according to the following method. In the first place, a funnel section and a panel section are put together with a bonding agent of frit glass that is set between them. The inside of the funnel section is previously applied with an electroconductive coating (herein-after referred to as "inner coating") and the panel section is previously provided with a fluorescent screen. Then, they are baked at about 450° C. to unify the funnel section and the panel section into a tubular body. Subsequently, an electron gun is built into the tubular body and the inside of the tube is evacuated through a tip tube that connects its neck section with a vacuum pump, while heating up to about 400° C. to exhaust needless gases from inside the tube. This step is called exhausting-baking step. After that, the tip tube is sealed up and cut to make the tubular body a closed system, then a substance of getter such as barium is scattered inside the tubular body to increase the degree of vacuum, thereby completing a cathode-ray tube.

The service life of the cathode-ray tube made according to the above method is closely related to the degree of vacuum inside the tube, and the degree of vacuum depends on the nature of inner coating. In other words, when the degree of vacuum in a cathode-ray tube is so low that there is a large quantity of needless gases in the tube, the ability of the cathode to release electrons becomes weak, and ultimately, the emission of electrons from the cathode is damaged. This is due to the fact that the electron beam emitted during the operation of cathode-ray tube ionizes needless gases to exert a harmful influence on the cathode.

Concerning the relationship between the degree of vacuum and the inner coating, when a large quantity of gas is released from the inner coating in an exhausting-baking step, the exhaustion cannot be completed during the exhausting-baking step. As a result, released gases remain in the tube to cause the reduction of the degree of vacuum. However, because the inner coating has the ability as getter, it adsorbs the needless gas in the tube to increase the degree of vacuum.

The properties of inner coating of this kind depend on the composition of coating material on the inner surface of a cathode-ray tube. In general practice, the inner coating is formed by applying a coating material to the inner surface of a funnel by means of spraying, brushing, flow coating or the like, and it is then dried. The coating material for inner surface used here is generally made by suspending or dispersing an electroconductive substance of graphite particles and particles of metal compounds to regulate the electrical resistance, in an aqueous medium that contains a dispersing agent and alkali silicate as an adhesive. The metal compounds are exemplified by metal oxides and metal carbides such as iron oxide, titanium oxide and silicon carbide.

Among the components of the above coating materials, alkali silicate compound is a gas-releasing substance and graphite particles serve as an adsorbent for gases. The reason for that the alkali silicate compound works as a gas-releasing substance is such that the ions of alkali metal of alkali silicate in the inner coating move to the surface of coating according to various conditions, and they combine with carbon dioxide ($CO_2$) and water vapor ($H_2O$) to form hydrogen carbonates or carbonate hydrates. It is supposed that these products are subjected to thermal decomposition by heating in the exhausting-baking step to generate gases such as carbon dioxide and water vapor.

Incidentally, it is well known as a technical art for suppressing the movement of alkali ions derived from alkali silicate of an electroconductive coating, i.e., inner coating, to utilize "mixed alkali effect" that is produced when two or more kinds of alkali metals are mixed in a glass. This "mixed alkali effect" is disclosed, for example, in the publication by Masayuki Yamane, "For people who make glass for the first time", issued Jul. 10, 1989, published Uchidarokakuho, p. 85–86.

A foregoing art in applying the "mixed alkali effect" to the inner coating of cathode-ray tube related to the present invention is disclosed, for example, in Japanese Laid-Open Patent Publication No. 52-52362 (1977). That is, the quantities of gases adsorbed from the atmosphere such as $H_2O$, $CO_2$, etc. are suppressed by using an inner coating that contains a bonding agent of silicates consisting of sodium silicate and/or potassium silicate and lithium silicate to reduce the quantity of gases released from the coating. However, the invention intends to improve the gas-releasing property, but does not take the adsorption of needless gases into consideration.

In the following, it will be described that graphite particles work as a gas adsorbent. The reason for this effect has not been made clear, but according to the report by Hashiba, et al. (J. Vac. Soc. Jpn., 42 [12] (1999) p. 70–75), graphite has actually an adsorbing effect. In addition, an example of applying the adsorbing effect of graphite to the production of fluorescent display tube is described in Japanese Laid-Open Patent Publication No. 57-136747 (1982).

As mentioned above, in alkali silicate compounds as gas-releasing source in particular, various properties such as viscosity and film-forming property change largely depending on the kinds and the compositions of alkali metals composing the salts and on the ratio of silicon dioxide to alkali metal oxides. Therefore, with a simple technique as used in the above conventional method, it is impossible to make the best use of the ability of graphite of adsorbing and to attain a sufficient effect.

BRIEF SUMMARY OF THE INVENTION

In view of the above technical background, both the gas-releasing property and the gas-adsorbing property of the inner coating have been fully taken into consideration. As a result, the object of the present invention is to provide a coating material for the inner surface of a cathode-ray tube that is most suitable for increasing the degree of vacuum in the tube by suppressing the quantity of gas released from the inner coating and making the best use of the adsorbing ability of graphite.

This invention, thus, relates to a coating material for the inner surface of a cathode ray tube which comprises an aqueous dispersion medium containing alkali silicate compounds consisting of lithium and potassium and a dispersing agent, and graphite particles or a composition of graphite particles and metal oxide particles or metal carbide particles suspended therein, wherein the molar ratio of potassium to lithium (K/Li) in the dispersion medium is in the range of 1 to 9, and the molar ratio ($SiO_2/R_2O$) of silicon dioxide ($SiO_2$) in the dispersion medium to the total alkali metal oxides ($R_2O$) that is converted taking the contents of lithium and potassium in the dispersion medium, is in the range of 2.5 to 3.5.

DETAILED DESCRIPTION OF THE INVENTION

Figure 1:
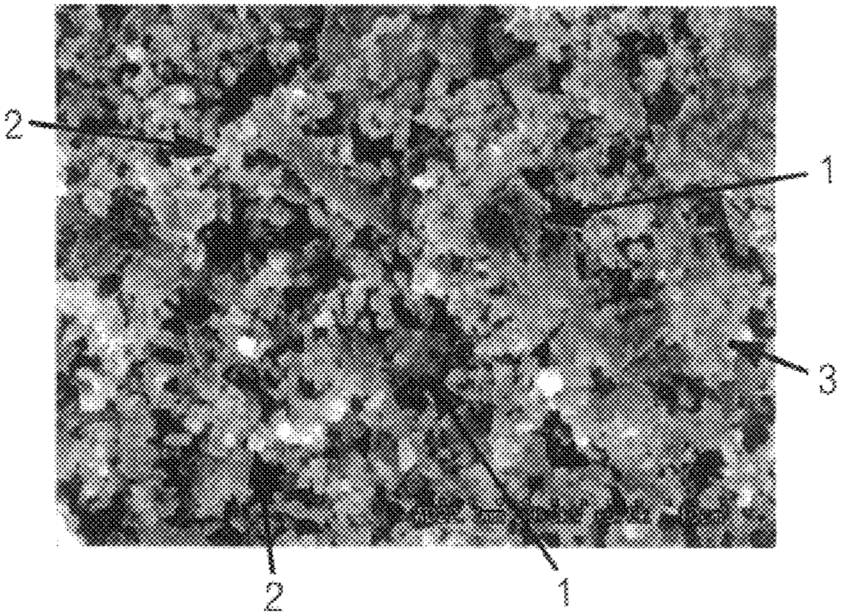
FIG. 1 is an electron microscope photograph of the coating surface of Sample No. 7.

In the present invention, lithium and potassium are used as alkali components of alkali silicate compounds in the aqueous dispersion medium because this combination of metals can make the best use of the above "mixed alkali effect". That is, the larger the difference of masses between mixed alkali metals is, the more the mixed alkali effect works. Accordingly, among the alkali metals generally used in alkali silicate compounds, such as lithium, sodium and potassium, the lithium having the smallest mass and the potassium having the largest mass were selected. With the combinations of alkali metals other than lithium and potassium, for example, the combinations of lithium and sodium, or sodium and potassium, the "mixed alkali effect" can be expected to some extent. However, in order to attain the sufficient effect, the combination of lithium and potassium is preferable.

The molar ratio of potassium to lithium (K/Li) in the dispersion medium is limited to the range of 1 to 9. The reason for this limitation is that the alkali silicate should have the viscosity suitable for forming an ideal film structure for adsorption by graphite particles within the range of molar ratio to produce the mixed alkali effect. The molar ratio of "K/Li" mentioned above is expressed by the quantity of K in mole relative to the quantity of Li in mole present in the dispersion medium, which is calculated according to the following formula (I).

$$K/Li = \frac{\text{Quantity of } K/39.1}{\text{Quantity of } Li/6.9} \qquad (I)$$

wherein 39.1 is atomic weight of K, and 6.9 is atomic weight of Li.

If the molar ratio of K/Li in the dispersion medium is larger than 9, the content of Li is too low to obtain a sufficient mixed alkali effect. On the other hand, if the molar ratio of K/Li in the dispersion medium is smaller than 1, the viscosity of alkali silicate compound increases in drying owing to the thickening effect of lithium to form an alkali silicate layer on the surface of coating. As a result, the adsorptive surface of graphite is also covered by the alkali silicate layer formed on the surface of coating, so that the graphite particles lose the adsorbing effect.

The molar ratio of the quantity of silicon dioxide ($SiO_2$) in the dispersion medium to the quantity of total alkali metal oxides ($R_2O$) converted from the contents of lithium and potassium in the dispersion medium ($SiO_2/R_2O$) is in the range of 2.5 to 3.5. The reason for this limitation is that the total number of alkali ions moving to the surface should be decreased while the viscosity of alkali silicate is kept at an appropriate value. The molar ratio "$SiO_2/R_2O$" mentioned above is expressed by the quantity of $SiO_2$ in mol relative to the quantity of $R_2O$ in mol present in the dispersion medium, which is calculated according to the following formula (II).

$$SiO_2/R_2O = \frac{\text{Qty. of } SiO_2 \text{ in mol}}{\text{Qty. of } Li_2O \text{ in mol} + \text{Qty. of } K_2O \text{ in mol}} = \frac{\text{Qty. of } SiO_2/60.1}{\text{Qty. of } Li_2O/29.9 + \text{Qty. of } K_2O/94.2} \qquad (II)$$

wherein 60.1 is molecular weight of $SiO_2$, 29.9 is molecular weight of $Li_2O$ and 94.2 is molecular weight of $K_2O$.

If the molar ratio $SiO_2/R_2O$in the dispersion medium exceeds 3.5, alkali silicate layer is formed on the surface of coating owing to the increase of the viscosity of alkali silicate, so that graphite particles lose the adsorbing effect. This situation is similar to the above one that the molar ratio of potassium to lithium in the dispersion medium is smaller than 1. If the molar ratio $SiO_2/R_2O$ in the dispersion medium is smaller than 2.5, the total number of alkali metal ions relative to silicon dioxide is too large. As a result, the total number of alkali metal ions moving to the surface is not so different from that in the case wherein the mixed alkali effect is not utilized.

Thus, the present invention provides a coating material for the inner surface of a cathode-ray tube that can form a film structure ideal for the gas adsorption of graphite particles. This effect is obtained by reducing the formation of alkali silicate compounds that work as gas-releasing sources during exhausting-baking with the aide of the "mixed alkali effect" and controlling the viscosity of the alkali silicate compound.

Furthermore, by forming the inner coating of a cathode-ray tube with this coating material, it is possible to reduce the time required for exhausting-baking, and to lower the temperature of degassing. When exhausting-baking is carried out by the same conditions as those in the conventional method, the degree of vacuum in the tube increases, so that the service life of cathode-ray tube can be prolonged.

PREFERRED EXAMPLES

The present invention will be described in more detail with reference to examples. It should be noted that the present invention is not limited by these examples.

(Preparation of Aqueous Alkali Silicate Solution)

The following four kinds of materials were used for preparing the aqueous solutions of alkali silicate compounds (sample materials) in the present invention.

(1) Aqueous potassium silicate solution (trade name: SNOWTEX K, made by Nissan Chemical Industries, Ltd.; hereinafter referred to as "potassium silicate A"), which contains 22.7% by weight of silicon dioxide ($SiO_2$) and 9.3% by weight of potassium oxide ($K_2O$), and has a molar ratio of silicon dioxide to potassium oxide ($SiO_2/K_2O$) of 3.8.

(2) Aqueous potassium silicate solution (made by the inventors themselves; hereinafter referred to as "potassium silicate B"), which contains 12.6% by weight of silicon dioxide and 19.4% by weight of potassium oxide, and has a molar ratio of silicon dioxide to potassium oxide of 1.0.

(3) Aqueous lithium silicate solution (trade name: LSS-35, made by Nissan Chemical Industries, Ltd.; hereinafter referred to as "lithium silicate A"), which contains 20.6% by weight of silicon dioxide and 3.02% by weight of lithium oxide ($Li_2O$), and has a molar ratio of silicon dioxide to lithium oxide ($SiO_2/Li_2O$) of 3.4.

(4) Aqueous lithium silicate solution (trade name: LSS-75, made by Nissan Chemical Industries, Ltd.; hereinafter referred to as "lithium silicate B"), which contains 20.4% by weight of silicon dioxide and 1.35% by weight of lithium oxide, and has a molar ratio of silicon dioxide to lithium oxide of 7.5.

These four kinds of aqueous alkali silicate solutions and pure water were compounded according to the mixing ratios shown in Table 1 using a stirrer to prepare aqueous solutions of alkali silicate compounds having various values of K/Li and $SiO_2/R_2O$ (effective solid content: 20% by weight). In the compounding step, the quantities of components must be calculated every time because every lot of reagent is a little different from another one in the contents of effective components and in the molar ratio of silicon oxide to alkali oxide, even if the name of reagent is identical.

TABLE 1

| Name of Alkali Silicate | Potassium Silicate [wt %] A | Potassium Silicate [wt %] B | Lithium Silicate [wt %] A | Lithium Silicate [wt %] B | Pure Water [wt %] | Molar Ratio (K/Li) | Molar Ratio ($SiO_2/R_2O$) |
|---|---|---|---|---|---|---|---|
| Molar Ratio ($SiO_2/K_2O$) | 3.8 | 1.0 | — | — | | | |
| Molar Ratio ($SiO_2/Li_2O$) | — | — | 3.4 | 7.5 | | | |
| | Aqueous Alkali Silicate Solution | | | | | | |
| No. 1 | 12.41 | 8.03 | 56.99 | — | 22.58 | 0.5 | 3.0 |
| No. 2 | 10.00 | 18.08 | 46.64 | — | 25.29 | 1.0 | 2.5 |
| No. 3 | 23.64 | 8.70 | 40.80 | — | 26.80 | | 3.0 |
| No. 4 | 34.28 | 1.39 | 36.35 | — | 27.98 | | 3.5 |
| No. 5 | 14.12 | 29.96 | 24.96 | — | 30.96 | 3.0 | 2.0 |
| No. 6 | 28.06 | 18.44 | 21.68 | — | 31.82 | | 2.5 |
| No. 7 | 38.75 | 9.61 | 19.16 | — | 32.48 | | 3.0 |
| No. 8 | 47.22 | 2.61 | 17.16 | — | 33.01 | | 3.5 |
| No. 9 | 30.74 | 8.13 | — | 34.77 | 26.36 | | 4.0 |
| No. 10 | 37.72 | 18.64 | 8.32 | — | 35.32 | 9.0 | 2.5 |
| No. 11 | 46.95 | 10.10 | 7.39 | — | 35.57 | | 3.0 |
| No. 12 | 54.32 | 3.28 | 6.64 | — | 35.76 | | 3.5 |
| No. 13 | 28.59 | 29.57 | 5.88 | — | 35.96 | 15.0 | 2.0 |
| No. 14 | 48.91 | 10.21 | 4.58 | — | 36.30 | | 3.0 |
| No. 15 | 56.22 | 0.59 | — | 8.37 | 34.82 | | 4.0 |

With the compounding methods other than the above, similar aqueous solutions of alkali silicate compounds can be obtained. For example, a method comprises the steps of adding prescribed quantities of an aqueous solution of lithium hydroxide (LiOH) and an aqueous solution of potassium hydroxide (KOH) in an aqueous potassium silicate solution or aqueous lithium silicate solution and compounding them. Another example of the method comprises the steps of adding the prescribed quantities of aqueous lithium hydroxide solution and aqueous potassium hydroxide solution in a colloidal silica (fine particles of water soluble silicic acid anhydride) and stirring with heating.

(Preparation of Coating Materials)

As components of coating materials were used 5 parts by weight of graphite particles of 2 $\mu$m in average particle diameter as electroconductive material, 10 parts by weight of titanium oxide of 0.5 $\mu$m in average particle diameter as resistance-regulating material, 1 part by weight of carboxymethyl cellulose as dispersing agent, and 49 parts by weight of pure water as medium. To these materials were compounded 35 parts by weight of various aqueous solutions of alkali silicate compounds (sample materials) prepared according to the above methods, and the mixture was stirred sufficiently with a stirrer to prepare suspensions. Then, these suspensions were subjected to dispersing treatment with a ball mill to obtain the coating materials for the inner surface of a cathode-ray tube (coating material for evaluation).

(Preparation of Coating Films and Their Evaluation)

As the methods for preparation of coating films and their evaluation, thermal desorption spectroscopy (TDS method) was used, which is described in the article of "Gas Desorption and Adsorption Properties of Inner Coating Materials Used for Cathode Ray Tube—Graphite, Titanium Oxide and Water Glass Mixed Material—", in the above-mentioned publication: J. Vac. Soc. Jpn., 42 [12] (1999) p. 70–75. The details are as follows.

In the first place, the prepared coating material for evaluation was applied to both sides of a stainless steel substrate (20 mm×60 mm), and dried at room temperature by unforced drying. Then, it was subjected to baking in the atmosphere to complete a coating film. This coating film was loaded in a vacuum apparatus, and evacuation was carried out for about 20 hours until the pressure inside the vacuum vessel reached $3\times10^{-5}$ Pa or less.

Subsequently, the sample in the vacuum vessel was heated up to 500° C. at the increasing rate of 10° C./min. by conducting electricity directly, while the quantity of released gas was measured by a quadrupole mass spectrometer. Almost all of the gas released from the coating film consists of $H_2O$ and $CO_2$, the total of which is defined as quantity of released gas.

Then, the measurement of the quantity of adsorbed gas will be explained. Each sample used for measurement of the quantity of released gas is subjected to forced adsorption of $CO_2$ gas at room temperature for 40 minutes. Then, the inside of the vacuum vessel is evacuated again to $3\times10^{31\ 5}$ Pa or less, and the sample is heated in the same manner as that in the measurement of the quantity of released gas to release the gas adsorbed in the sample, the total of which is defined as quantity of adsorbed gas.

The results of evaluation will be shown in Table 2. In the table, sample No. 7 (Example 5) has the molar ratio of potassium to lithium (K/Li) of 3.0 and the molar ratio of silicon dioxide to total alkali oxides ($SiO_2/R_2O$) of 3.0. The quantity of released gas and that of adsorbed gas of sample No. 7 are taken as standards (100), relative to which the results of the other samples are indicated. As to sample No.7, the quantity of released gas was 0.6 Pa·m$^3$/g-coating, and that of adsorbed gas was $4\times10^{-3}$ Pa·m$^3$/g-coating.

TABLE 2

| Alkali Silicate Sample No. | Molar Ratio (K/Li) | Molar Ratio ($SiO_2/R_2O$) | Qty. of Released Gas | Qty. of Adsorbed Gas | Notes(*) |
|---|---|---|---|---|---|
| No. 1 | 0.5 | 3.0 | 88 | 45 | Comp. Ex. 1 |
| No. 2 | 1.0 | 2.5 | 95 | 99 | Ex. 1 |
| No. 3 | | 3.0 | 93 | 96 | Ex. 2 |
| No. 4 | | 3.5 | 90 | 94 | Ex. 3 |
| No. 5 | 3.0 | 2.0 | 269 | 108 | Comp. Ex. 2 |
| No. 6 | | 2.5 | 110 | 102 | Ex. 4 |
| No. 7 | | 3.0 | 100 | 100 | Ex. 5 (Standard) |
| No. 8 | | 3.5 | 91 | 98 | Ex. 6 |
| No. 9 | | 4.0 | 89 | 50 | Comp. Ex. 3 |
| No. 10 | 9.0 | 2.5 | 112 | 109 | Ex. 7 |
| No. 11 | | 3.0 | 109 | 107 | Ex. 8 |
| No. 12 | | 3.5 | 105 | 100 | Ex. 9 |
| No. 13 | 15.0 | 2.0 | 500 | 125 | Comp. Ex. 4 |
| No. 14 | | 3.0 | 250 | 120 | Comp. Ex. 5 |

TABLE 2-continued

| Alkali Silicate Sample No. | Molar Ratio (K/Li) | Molar Ratio ($SiO_2/R_2O$) | Qty. of Released Gas | Qty. of Adsorbed Gas | Notes(*) |
|---|---|---|---|---|---|
| No. 15 | | 4.0 | 200 | 70 | Comp. Ex. 6 |

(*)Ex.: Example,
Comp. Ex.: Comparative Example

First, the results of measuring the quantity of released gas will be examined. Alkali silicate compounds of sample Nos. 1 to 4 and 6 to 12 have the molar ratio of potassium to lithium (K/Li) of 9 or less and the molar ratio of silicon dioxide to the total alkali oxides ($SiO_2/R_2O$) of 2.5 to 4.0. The coatings made of the coating materials for evaluation obtained by using these samples and the coating made by using sample No. 7 taken as the standard do not differ much in the quantity of released gas. Sample No. 5 (Comparative Example 2) has the molar ratio K/Li of 3.0, but the molar ratio $SiO_2/R_2O$ is as small as 2.0, so that the coating made of the coating material for evaluation obtained by using this sample is remarkably great in the quantity of released gas. Sample Nos. 13 to 15 having the molar ratio K/Li of 15 are very high in the quantity of released gas, that is, 2 to 5 times that of the standard sample (sample No. 7) although the molar ratio $SiO_2/R_2O$ is varied.

Next, the results of measuring the quantity of adsorbed gas will be described. In the case of sample Nos. 9 and 15 having the molar ratio $SiO_2/R_2O$ of 4, the quantities of adsorbed gas are as small as 50% and 70% of that of the standard sample. In the case of sample No. 1 having the molar ratio K/Li of 0.5, the quantity of adsorbed gas is as small as a half of that of the standard sample although the molar ratio $SiO_2/R_2O$ is 3. On the contrary, alkali silicate compounds of sample Nos. 2 to 4, 6 to 8, and 10 to 12 have the molar ratio K/Li of 1 to 9 and the molar ratio $SiO_2/R_2O$ of 2.5 to 3.5, which are within the ranges according to the present invention. The coatings made of the coating materials for evaluation obtained by using these samples are sufficiently large in the quantity of adsorbed gas, that is, in the same level as that of the standard sample. This difference is understood clearly from the comparison of FIG. 1 and FIG. 2, which are electron microscope photographs of the coatings made of the coating materials for evaluation of sample No. 7 and No. 9, respectively.

Figure 2:
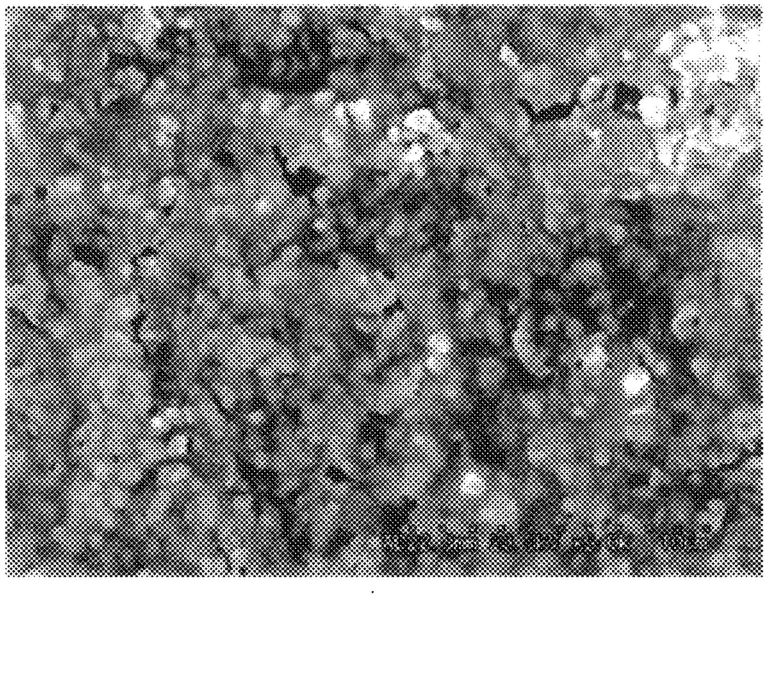
FIG. 2 is an electron microscope photograph of the coating surface of Sample No. 9.

In other words, in the surface of coating of sample No.7 shown in FIG. 1, graphite particles 1 and primary particles of titanium oxide 2 can be confirmed. In the photograph, flat and larger particles are graphite particles 1, and a lot of small light-colored particles are titanium oxide particles 2. The other amorphous particles are those of alkali silicate compounds 3. On the other hand, in the coating of sample No. 9 shown in FIG. 2, the layer of vitrified alkali silicate compound is formed on the surface. The particles of graphite and titanium oxide are buried in the above-mentioned layer, so that the graphite particles as adsorbent are difficult to confirm.

From the above results, it is understood that a coating material for the inner surface of a cathode-ray tube can be prepared by using the alkali silicate compounds having the molar ratio of potassium to lithium (K/Li) in the range of 1 to 9 and the molar ratio of silicon dioxide to the total alkali oxides ($SiO_2/R_2O$) in the range of 2.5 to 3.5. Furthermore, the inner coating formed with the above coating material is small in the quantity of released gas and high in gas-adsorbing ability, so that it has an excellent characteristic as the inner coating of a cathode-ray tube.

By forming an inner coating of cathode-ray tube using the coating material according to the present invention, it is possible to reduce the time period required for exhausting-baking (exhausting in a short time) and to reduce the temperature in degassing (exhausting at low temperature). Furthermore, when exhausting-baking is carried out by the same conditions as those in the conventional method, the degree of vacuum in the tube increases, so that the service life of cathode-ray tube can be prolonged.

What is claimed is:

1. A coating material for the inner surface of a cathode-ray tube comprising an aqueous dispersion medium comprising:

(a) a dispersing agent, (b) silicates of alkali metals, said alkali metals consisting of lithium and potassium, and (c) graphite, wherein said graphite is in particle form or a composition, wherein said coating material has a molar ratio of potassium to lithium (K/Li) in said dispersion medium from 1 to 9, and the molar ratio ($SiO_2/R_2O$) of silicon dioxide ($SiO_2$) in the dispersion medium to total alkali metal oxides ($R_2O$) that is converted taking the contents of lithium and potassium in the dispersion medium, from 2.5 to 3.5, wherein $R_2O$ is $K_2O$ and $Li_2O$.

2. The coating material of claim 1, wherein the metal oxide is selected from the group consisting of iron oxide and titanium oxide.

3. The coating material of claim 1, wherein the metal carbide is silicon carbide.

4. The coating material of claim 1, wherein the aqueous dispersion medium further comprises metal oxide particles suspended therein.

5. The coating material of claim 1, wherein the aqueous dispersion medium further comprises metal carbide particles suspended therein.

* * * * *